United States Patent
Johns

(10) Patent No.: US 7,143,246 B2
(45) Date of Patent: Nov. 28, 2006

(54) METHOD FOR SUPPORTING IMPROVED BURST TRANSFERS ON A COHERENT BUS

(75) Inventor: Charles Ray Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 10/759,939

(22) Filed: Jan. 16, 2004

(65) Prior Publication Data

US 2005/0160239 A1   Jul. 21, 2005

(51) Int. Cl.
*G06F 12/00* (2006.01)
*G06F 13/00* (2006.01)

(52) U.S. Cl. .................. 711/146; 711/141; 711/168; 710/35

(58) Field of Classification Search .............. None
See application file for complete search history.

(56) References Cited

U.S. PATENT DOCUMENTS

| | | | | |
|---|---|---|---|---|
| 5,623,629 A * | 4/1997 | Suzuki | ........................ | 711/141 |
| 5,655,102 A * | 8/1997 | Galles | ........................ | 711/150 |
| 5,710,906 A * | 1/1998 | Ghosh et al. | ................ | 711/146 |
| 5,717,894 A * | 2/1998 | Vivio | ........................ | 711/118 |
| 5,835,972 A * | 11/1998 | Choate | ...................... | 711/220 |
| 6,088,769 A * | 7/2000 | Luick et al. | ................. | 711/141 |
| 6,442,629 B1 * | 8/2002 | Arimilli et al. | .............. | 710/100 |
| 6,546,462 B1 * | 4/2003 | Palanca et al. | .............. | 711/135 |
| 6,877,071 B1 * | 4/2005 | Sherman | ..................... | 711/149 |
| 2003/0093657 A1 * | 5/2003 | Mayfield | .................... | 712/245 |
| 2003/0101297 A1 * | 5/2003 | Allen et al. | .................. | 710/107 |
| 2003/0131203 A1 * | 7/2003 | Berg et al. | ................... | 711/146 |
| 2003/0200395 A1 * | 10/2003 | Wicki et al. | ................. | 711/128 |
| 2004/0073623 A1 * | 4/2004 | Benkual et al. | .............. | 709/213 |

* cited by examiner

*Primary Examiner*—Matthew Kim
*Assistant Examiner*—Michael Krofcheck
(74) *Attorney, Agent, or Firm*—Stephen R. Tkacs; Stephen J. Walder, Jr.; Diana R. Gerhardt

(57) ABSTRACT

In a multiprocessor system, comprising master and slave processors, a cache coherency controller, and address concentration devices; a method for improving coherent data transfers is described. A command transaction is generated, and a subsequent command from an initiator. Tags added to the responses or further request responses, stream on high-speed busses. Snoops and accumulated snoops expand on cacheline requests as each processor separates burst commands into multiple cacheline requests. Address concentrators containing a cacheline queue function, funnel transaction requests to a global serialization device, where a queuing process prioritizes indicia and coordinates the results among the processors. The cache issues a single burst command for each affected line. System coherency, performance, and latency improvements occur. Additional support for burst transfers between coherent processors is provided.

16 Claims, 5 Drawing Sheets

METHOD FOR SUPPORTING IMPROVED BURST TRANSFERS ON A COHERENT BUS

TECHNICAL FIELD

The present invention relates generally to the field of multiprocessor architecture, and more specifically, to data transfer on coherent busses connecting processors.

BACKGROUND

Previous efforts to supply additional processing power by adding CPUs to a common bus resulted in a simple master-slave relationship between CPUs, called "non-coherent asymmetrical multiprocessing." Though this architecture was simple, it soon reached a "premature" bottleneck because of poor task distribution among processors. The architectural limitations occur in both software and hardware. Early operating system (OS) software neither could run in multiprocessor (MP) systems nor could take full advantage of the increased processing power.

Additionally, most I/O drivers were "single-threaded," which limited their execution to a single dedicated I/O processor. Initially, this was not a major problem because "non-coherent asymmetrical hardware" typically did not allow all processors access to all system resources. In general, non-coherent asymmetric hardware dedicates a single processor to I/O functions. The performance of this single I/O processor can, and often does, become the system bottleneck as it reaches its performance limits. Both the non-coherent asymmetric hardware and single-threaded software pose barriers to system performance. Thus, non-coherent asymmetric machines exhibit limited scalability because adding processors does not benefit a system that is limited by the performance of one of its processors.

The solution to this bottleneck was to redesign both the hardware and the software, which led to today's symmetric multiprocessors (SMPs) coupled with multithreaded software. An "SMP" is a system in which all processors are identical and all resources, specifically, all the memory and I/O space and interrupts, are equally accessible. While the symmetrical nature of SMP hardware eliminates any architectural barriers, the software must still efficiently divide the tasks among processors.

For performance reasons, most multiprocessor systems employ caches to reduce the latency of accessing the shared resources. Since caches are local copies of data, a hardware coherency protocol is used, in standard practice, for keeping the data in these caches consistent. Several multiprocessor systems offer dual-buses to provide for both communications with I/O resources and maintaining coherency. The bus used to maintain coherency is the 'MP bus'. Whether or not you choose a multibus architecture, you must optimize this interface for performance. When speaking of performance and buses, the operative word is "coherency." Coherency can take many forms in any multiprocessor. For example, an SMP can transmit coherency information across the MP bus for each change in cache state. Cache state maintenance is on blocks of data referred to as cache-lines. Cache-line buffers offer many benefits. First, they reduce the need for coherency information for each byte transferred. Second, they allow data transference, in a burst, over busses usually of smaller data width. Third, they reduce the size of the caching structure by reducing the amount of state information required for each byte in the cache (i.e. the cache tag). On an MP bus, the amount of data requested by a single command is limited to a cache-line. The limit is required to maintain coherency between system caches.

This invention applies to both the I/O bus as well as the coherent MP bus (i.e. the bus that maintains coherency between processors). The intention of the above description is not meant to limit the concept to SMPs. All MP types may use this or a similar means of achieving coherency.

Cache-line buffers allow transfer of a full cache line over the bus bridge, which raises two issues: What if the I/O device needs to transfer only a few bytes of data. Second, what if the transfer starts or ends in the middle of a cache line? You solve these problems in one of two ways: Some processor architectures allow only full cache-line transfers. In this case, you have no choice except to let the bus bridge perform a read-for-ownership cycle and then write the new data into the cache line. When the I/O device proceeds to the next cache line, the buffer must cast out the first line and read in the subsequent line. This approach consumes valuable bus bandwidth because a "worthless" cache-line read accompanies each burst write, which is needless when an I/O device is updating the entire cache line.

Additionally, the cache-line read causes each processor in the system to snoop its cache, potentially decreasing performance if the cache-line is modified. The snoop is still required to invalidate the line, even after a write-with-kill instruction is performed. If the cache-line is modified, the cache must write the modified data to memory before allowing the bus bridge to proceed with the read. These reads and writes are needless when new data from the bus bridge will overwrite the entire cache line. Prior art MP busses typically avoid the needless reads and writes by supporting a "Write with Kill" and "Read with Intent to Modify" operation. The "Write with Kill" operation informs the cache that the full cache-line requires writing to, thus allowing the cache straightforward invalidation of the line even though the line contains data. The bus bridge can then perform partial-word transfers until a cache-line boundary occurs. The bus bridge can then burst-write the cache lines without the performance of needless indicia reading and writing. It would be desirable, therefore, to be able to expand coherency actions for all cacheline requests by a burst command. A further goal would encompass separating the burst command, to allow the caches to be snooped. Lastly, it is preferable to address a cache design where an indication to the processor that multiple cache-lines are requested, is asserted.

SUMMARY OF THE INVENTION

In a multiprocessor system, coherent data transfers are improved, utilizing at least two processors, a cache coherency controller, and address concentrators. An initiating 'memory transaction request command', from either the master processor or cache coherency controller, passes to an initial processor. Then, logic within the cache coherency controller, determines a priority receipt status of a next memory transaction request from a subsequent processor or the cache coherency controller using high-speed busses. Using expandable snoop responses and accumulated snoop responses, coherency action is developed for all cacheline requests that utilize a burst command. The transaction requests from the master processor or cache coherency controller queue up in a single global serializing device, which also functions as a multiple cacheline request indicator.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

Figure 1:
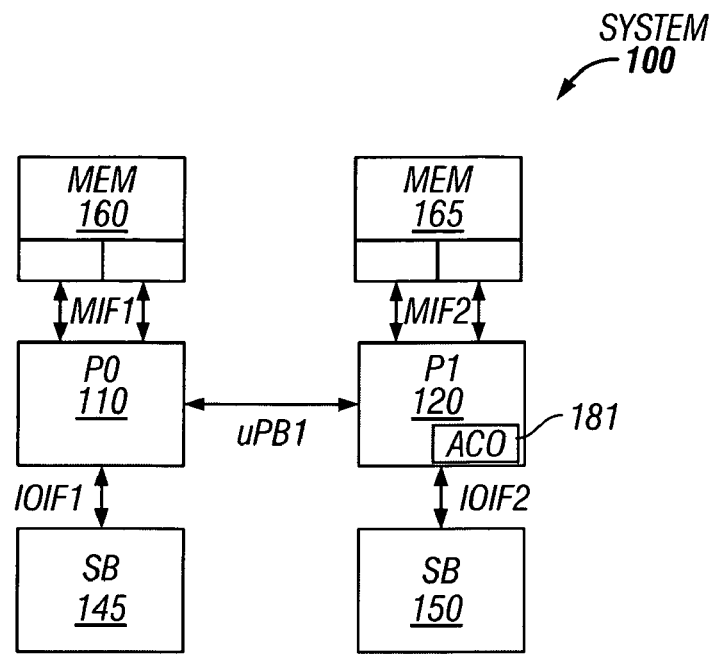
FIG. 1 illustrates an exemplary block diagram of a typical multiprocessor system comprising two processors.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In one embodiment, however, the functions can be performed by a processor, such as a computer or an electronic data processor, in accordance with code, such as computer program code, software, and/or integrated circuits that are coded to perform such functions, unless indicated otherwise. In the present specification, the same reference characters are used to refer to terminals, signal lines, and their corresponding signals.

Turning to FIG. 1, disclosed is an exemplary block of a typical multiprocessor system comprising of two processors. These types of multiprocessor systems are also known as MIMD (Multiple Instruction Multiple Data) stream systems. In the MIMD system, there are a set of 'n' processors simultaneously executing different instruction sequences on different data sets. Furthermore, according to Enslow, (Enslow P. H., Multiprocessor Organization—A Survey. Computing Surveys Vol. 9, No. 1, pp. 103–129. March, 1977.), there are two general types of MIMD processing systems. Of the first sub-type, (for which FIG. 1 is exemplary) a tightly coupled multiprocessor containing two or more processors of approximately comparable capabilities. All processors share access to a common memory. (This does not preclude the existence of local memories for each or some of the processors.). All processors share access to I/O channels, control units, and devices. (This does not preclude the existence of some local I/O interface and devices.). The entire system is controlled by one operating system. This sub-type is referred to as a SMP (Symmetric Multiprocessor) system. The second sub-type is named as 'loosely coupled multiprocessor'. In this sub-type is a multiplicity of general purpose, physical and logical resources that can be assigned to specific tasks on a dynamic basis. The above resources are physical distributed and interacting through a communication network. A high-level operating system (OS) unifies and integrates the control of the distributed components, though individual processors may have their own local OS. System Transparency which permits services to be requested by name only, without having to identify the serving resource, and cooperative autonomy which characterize the operation and interaction of both physical and logical resources. Although cooperation between resources is pre-designed, the notion of autonomy permits a serving resource to refuse a request of service, or delay it, if it is busy processing another task. Lastly, there is no hierarchy of control within the system.

A "loosely coupled multiprocessor" system does not allow sharing of resources such as system memory. The processors in these types of systems usually connect using a high-speed network. These systems typically do not support coherency between the processors. All communication typically processes using a message passing protocol.

The tightly coupled SMP is, at present, considered as state of the art for MP systems because, among other important features, it communicates through a shared global memory. The shared global memory reduces device counts, latency, and other design issues.

The tightly coupled SMP can take great advantage of cache memories. Cache memories will also unload the heavily used system bus; bring down latencies globally in the whole system as well as local when the cache contains the requested data.

To address the first issue, the command transaction expands to allow more than one cache-line to be requested (i.e. burst command) and, the snoop response and accumulated snoop response transactions expand to provide a coherency action for all cacheline requests by the burst command. One embodiment for the command is to add or expand the request size to support multiple cache-lines. Other embodiments may include additional fields for identifying the addresses request, if they are not sequential. One embodiment for the response is to add fields within the response transactions. Furthermore, the transactions do not require transmission on the lower speed I/O and MP busses.

In today's current high-speed busses, transactions are formatted into packets. Packets typically include the transaction type (for example Command, Response, Data), an error checking field (for example CRC), as well as unused or reserved fields. Unused and reserved fields are necessary since packets typically have a minimum length. These packets then transfer across a narrow interface to the other devices. This exemplary implementation expands the information in the packet to support a coherent burst transfer. The unused and reserved fields help limit the additional amount of information sent on the bus.

To address the second issue, the internal bus interface for each processor within the multiprocessor system, separates the burst command into multiple cacheline requests on the internal bus. The separation allows snooping of each cache. Alternatively, the internal bus and caches can accept modifications to support direct snooping of burst request without separate commands needed for each cacheline. At each processor bus interface, the snoop responses for each requested cache-line then coalesce into a single 'processor bus snoop response' for the burst command. Alternatively, the internal bus and caches accept modifications to support a single response for multiple cache-lines.

Finally, a collection function is designed to gather separate cache-line commands into a single burst command on the MP bus. The burst command provides an indication to the system that more than one cacheline is requested. In this instance, the cache issues a single burst command for each of the requested lines. A typical processor design (including the cache) will also request (i.e. pre-fetch) additional lines in an attempt to reduce the latency for future cache misses. The gathering function takes advantage of the request and an additional important feature is that of closely matching the timing sequence during the collection process, so the latency improvements are fully realized. Another embodiment is issue a burst command directly from the processor's cache. Doing so eliminates the need for a separate gathering function and greatly simplifies the timing issues. In addition, supporting a burst command directly, allows for a tight coupling of the burst command with the pre-fetch features of the processor.

Therefore, it is a primary goal of the preferred embodiment of the System 100 to improve the performance of tightly coupled synchronous or asynchronous multiprocessor systems by reducing the amount of coherency traffic. It is a further purpose of the representative System 100 to support coherency on transfer greater than a cacheline. A third aim of the exemplary System 100 is to provide additional support for burst transfers between coherent processors.

Handling of a single cache-line burst is exhaustively documented in the literature. Most bus protocols support a variety of commands to limit the amount of bus traffic (for example a "Write w/Kill" to avoid unnecessary writes of modified cache-lines which will be overwritten by a request). However, most busses only work on a single cache-line. A primary purpose of the preferred embodiment is to support transfers on the I/O and MP busses to allow multiple cache-lines to be requested. Since the coherency traffic on the bus is usually a bottleneck in both performance and latency, a method to request coherency for multiple cache-lines will improve the overall performance of the system by reducing the amount of coherency traffic. Taken together, these methods should provide significant power savings and reductions in processing bottlenecks.

When a CPU puts an address on the bus, the cache controllers check if the data for that address is in the cache. If it is (which is called a 'hit'), the cache provides the data fast back to the CPU. If the data is not in the cache, (called a miss), the cache must swap out some data that probably will not be used with the requested one from the primary memory.

With the spatial behavior of programs in mind, a logical approach is to load a block of data from the underlying hierarchic memory in response to a miss to improve the latency for future accesses. This technique is known as pre-fetch.

Interfaces used for the data exchange between the component processors of a distributed system are classified into bus interfaces and point-to-point interfaces dedicated to connecting two or more processors. Busses are implemented with as a serial or parallel interface. Buses have the following properties. First, the bus is a unique resource shared between several masters and requiring an access protocol. Second, the destination of a message must be decoded from it; each processor on the bus can communicate to every other and broadcast to several ones at a time and lastly, the bus data bandwidth may be shared by the N processors.

A bus is similar to a sequential processor, in that it is an active device on its own. In contrast, for point-to-point interfaces, no access protocol is required. The data bandwidth is not shared between processors. The data bandwidth is expanded by adding a new processor node with extra interfaces. In a large network, not every pair processor can be directly link together. Information transferred between processors not directly linked must pass through intermediate nodes or switches.

In FIG. 1, the exemplary SYSTEM 100 comprises a processor P0 110 connected to memory subsystem MEM 160 through a memory bus MIF 1, and to a South-bridge SB 145, the input-output subsystem, through an input-output interface, IOIF 1. An input-output subsystem is one or more integrated circuits designed to perform specific functions of onboard peripherals. One type of input-output subsystems is referred to as a Southbridges. System Memory is directly connected to the processor. SYSTEM 100 further comprises a second processor, P1 120 connected to memory subsystem MEM 165 through a memory bus MIF 2, and to a system bus SB 150 through an input-output interface, IOIF 2. Even though the processors each connect physically separate memory subsystems, both memory subsystems operate as a single contiguous logical system memory. (This does not preclude the use a single physical memory connected to both processors.) Processor P0 110 and P1 120 are further connected to each other through a unified processor bus μPB1. Communication between P0 110 and P1 120 and the subsystem physically attached to P1 120, and between P1 120 and P0 110 and the subsystems physically attached to P0 110 is via a unified processor bus, μPB1. The μPB1 is a coherent processor bus used in SYSTEM 100 for maintaining coherency between the caches in P0 110 and P1 120 and for transmitting data between processors and between a processor and a subsystem physically attached to the other processor. Contained within P1 120 is an AC0 181 process that serializes the commands from all processors for proper coherency operation. The serialized commands are then broadcast to all processors and devices in the system as reflected commands. Reflected commands are snooped by all caches in the system and are decoded by all devices.

Figure 1A:
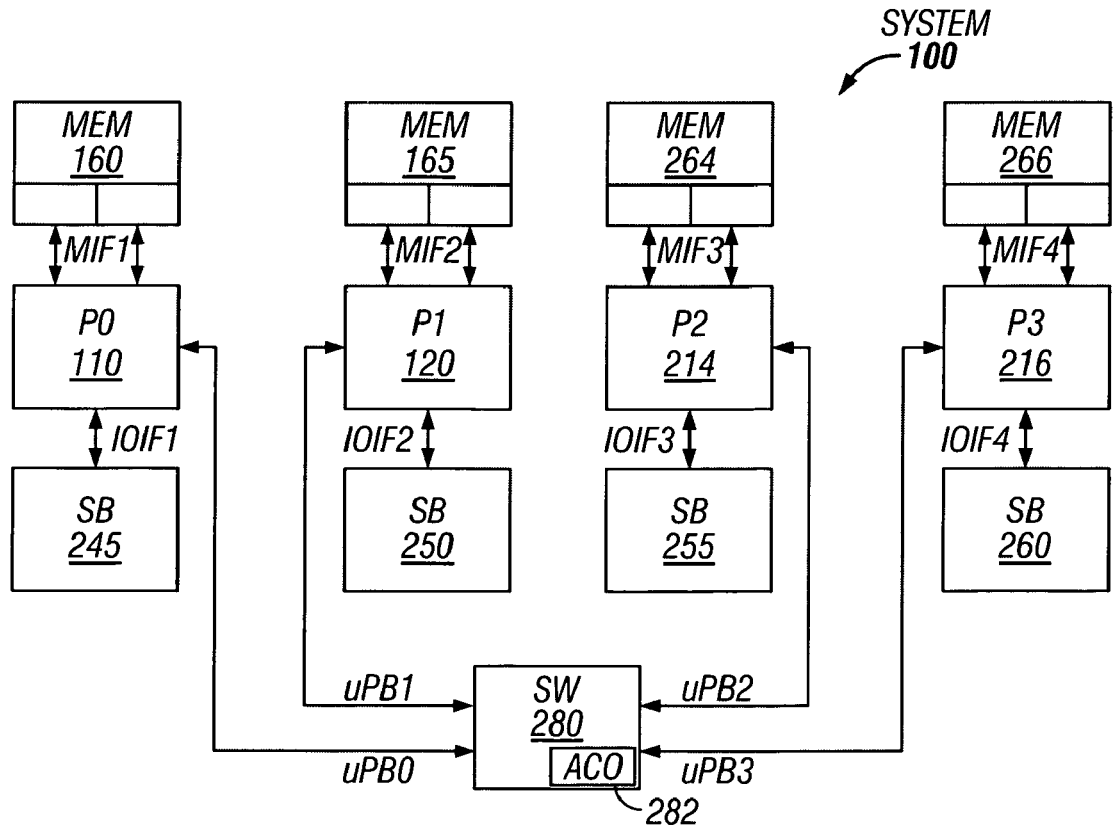
FIG. 1A illustrates an exemplary diagram of a typical multiprocessor system comprising four processors.

Turning to FIG. 1A, disclosed is an exemplary diagram of a typical multiprocessor SYSTEM 200 comprising four processors. Each processor, P0 210 through P3 216 is configured essentially the same as in FIG. 1, with their own control units, CU 160 through CU 266, and system busses. Processors P0 210 through P3 216 are connected to memory subsystems MEM 260 through MEM 266, through memory busses MIF1 to MIF4, and further connected to Southbridges (SB) 245 through SB 260. Hence, the processors connect to the input-output subsystem, through input-output interfaces IOIF 1 through IOIF 4.

Processors P0 110 through P3 216, inclusive, further connects to the switch SW 280 through individual unified processor busses μPB0 through μPB3. Each processor transmits indicia through a dedicated processor bus (μPB1 through μPB4). However, rather than directly connected as in FIG. 1, a switch SW 280 in FIG. 1A routes the influx of the indicia from each active bus in an orderly manner. Communication between the μPBs through the switch SW 280 function is required for maintaining coherency between the caches in each individual processor and for transmitting data between processors and between a processor and a subsystem located physically attached to the other processor. Contained within SW 280 is an AC0 282 process device that serializes the commands from all processors for proper coherency operation. AC0 282 performs the same function as AC0 181 in FIG. 1.

Figure 2:
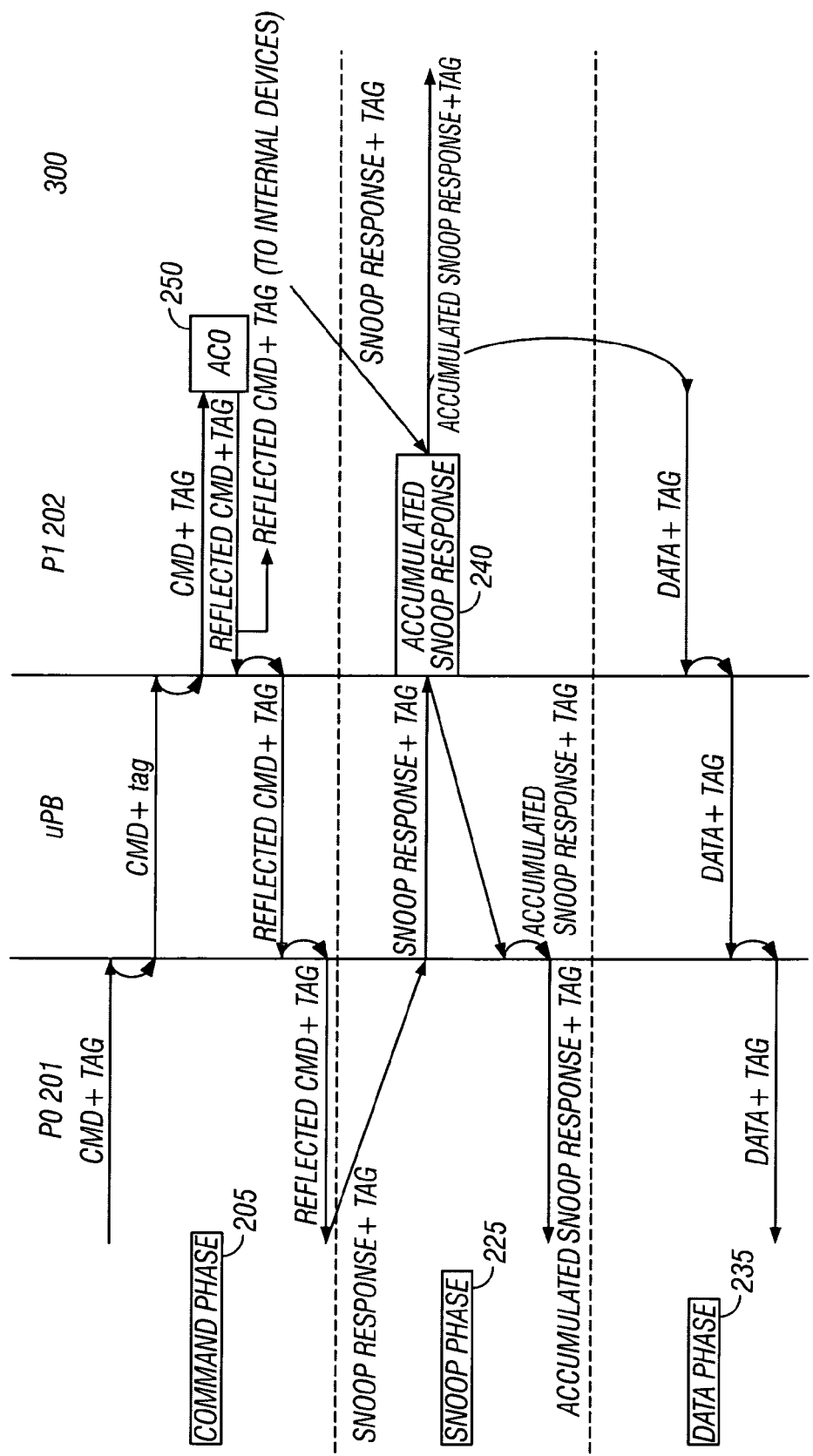
FIG. 2 illustrates an exemplary implementation of a load coherency protocol.
Figure 3:
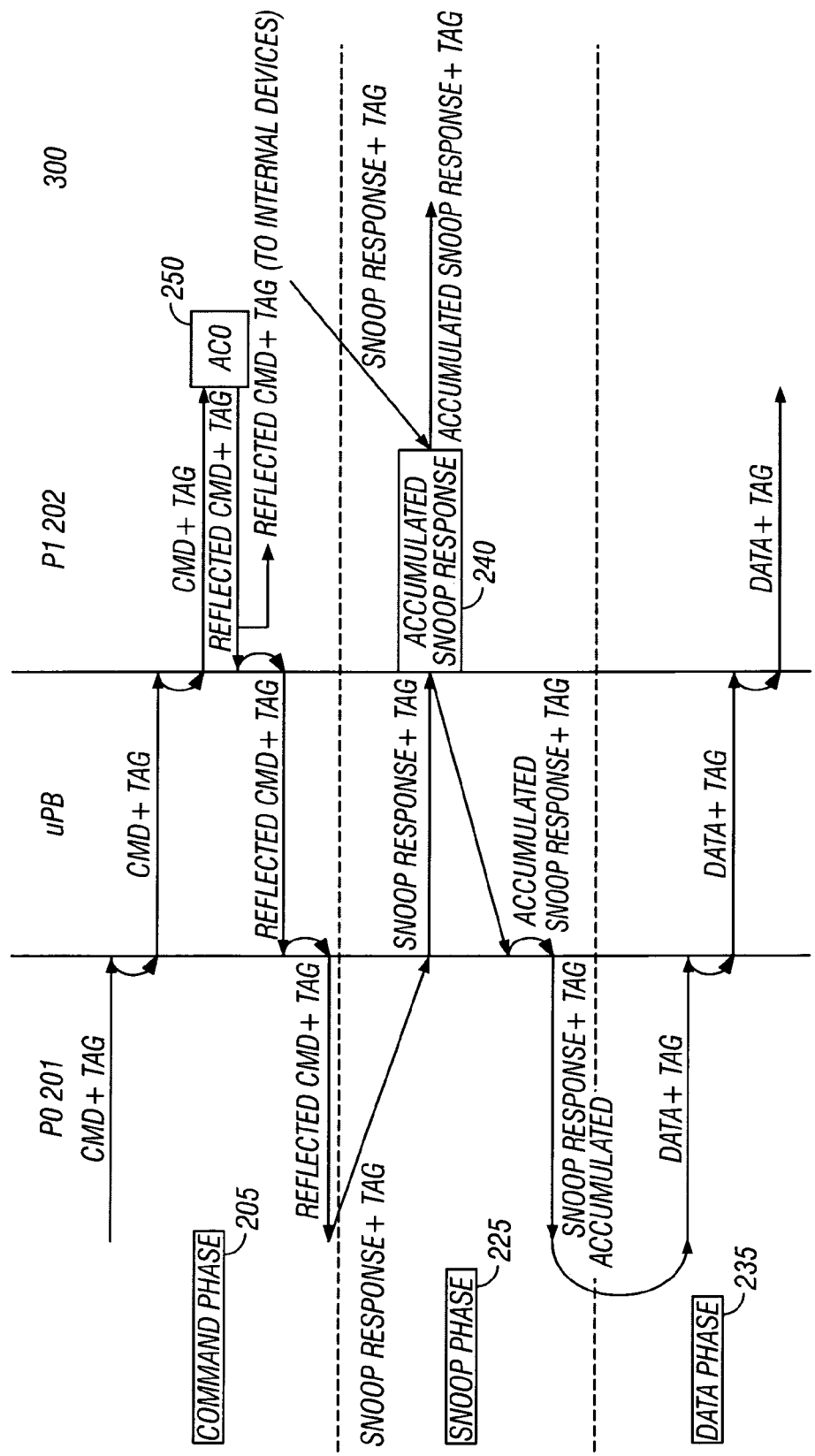
FIG. 3 illustrates an exemplary implementation of a store coherency protocol.

FIGS. 2 and 3 are an exemplary implementation of a MP bus protocol used for maintaining coherency in a prior art multiprocessor system. More specifically, FIG. 2 is an exemplary implementation of a load (i.e. read) transaction and FIG. 3 is an exemplary implementation of a store transaction. Transactions are usually a cache-line memory access request by various devices or processes. Memory access requests are typically the result of an operation, which cannot be serviced by the local cache hierarchy. Transactions are typically separated into three phases: Command, Snoop, and Data. The Command phase is the request for the transfer of information. Separate command types distinguish between load and store requests. Typically, a MP bus has various forms of load and store request as well as other command types not described herein. All MP bus commands generally follow the same protocol as outlined in FIGS. 2 and 3. The command phase is comprised of two command transactions. The first transaction is the command from the requestor to the ACO process. The second command is the reflected command from the AC0 process. AC0 generates the reflected command by serializing commands received from all requesters. The Snoop phase provides for maintaining coherency and the Data phase provides for transfer of the data requested by the command. The snoop phase is comprised of two response transactions. The first transaction is the result of the cache snoop of the reflected command. Each cache sends a snoop response. The snoop responses are accumulated. The accumulated snoop response is then broadcast to all snoopers. Not all transactions require a Data phase. An example of such a transaction is a memory request serviced by the memory subsystem attached directly to the requesting processor. For this transaction, the command and snoop phases are required for coherency. There is no need for a data phase in this case, since the data transfers directly to the processor using the MIF. A transaction can be initiated by a master device or a cache coherency controller (i.e. snooper) and results in a series of packet transfers between the master and slave.

Turning to FIG. 2, illustrated is one exemplary implementation of a MP busload transaction initiated from processor P0 201, in a two-processor system. The basic sequence for a MP busload transaction is as follows.

In a Command Phase 205, an initiator generates a command, 'CMD+tag'. This tag is a transfer tag and is a unique identifier for each outstanding command. A tag is further employed to associate snoop responses and load data with a command (i.e. load request), that is, as a reference datum to determine its status. Another purpose of the tag is to route load data to the requester. The tag on the snoop response is used when snoop responses are allowed for returns in an order different from that of reflected commands. The tag can be implied if the snoop responses are in the order of reflected commands.

Next, the command is forwarded to the serialization point, AC0 250 using a MP bus command transfer. Each representative SYSTEM 100 has only one global serialization point. AC0 250 determines the order in which processor P0 201's requests and requests from other masters enter the performance stage. Next, the command is broadcast to all entities in the system in an order determined by the AC0 250 process. Entities include bus masters, cache controllers, storage controllers, and bus bridges.

Broadcasting the Command Phase 205 'Reflected CMD+ tag' from a single serialization point, AC0 250, guarantees that all entities receive the commands in the same order. The 'Reflected CMD+tag' is a copy of the CMD generated by the requester. Each entity returns a snoop reply using a Snoop Phase 225 'snoop response' transaction to Accumulated Snoop Response function 240 in the reflected command (CMD) order. Then, AC0 250 merges all snoop replies corresponding to a reflected command into a single accumulated snoop response.

After receiving and merging all the snoop replies for a reflected command into a single accumulated snoop response, the AC0 250 broadcasts the agglomerated response to all the entities using an 'Accumulated Snoop Response' transaction. If the 'Accumulated Snoop Response' indicates a successful transaction, all the permanent cache state transitions occur and, if required, the data transfers during Data Phase 235. The tag is appended to the data by processor P1 202. The data transferred to the requestor, P0 202 in this case, by P1 202 (the slave). Processor P0 201 uses the tag for associating the data with the original command request and for routing the data to the correct entity with in processor P0 201. The tag is also used for routing the data to the requestor.

There are cases in which the transaction cannot complete successfully due to a resource conflict or conflict with other transactions. In such a case, the 'Accumulated Snoop Response' received by all the entities is 'Retry'. Upon receiving a 'Retry Response', the initiator (or master) is responsible for reissuing the transaction. The transaction can be reissued using the same or a different transaction type. The command can also be reissued using the same or a different tag. Retried transactions are an additional transaction where a Data Phase 235 is not required.

Turning to FIG. 3, illustrated is one exemplary implementation of a MP bus store transaction initiated from processor P0 201. The basic sequence of a MP bus store transaction is the same as the MP busload transaction. For a store operation, the data is transferred to the slave, P1 202 in this case, instead of the requester, as in FIG. 2, during the Data Phase 235.

Figure 4:
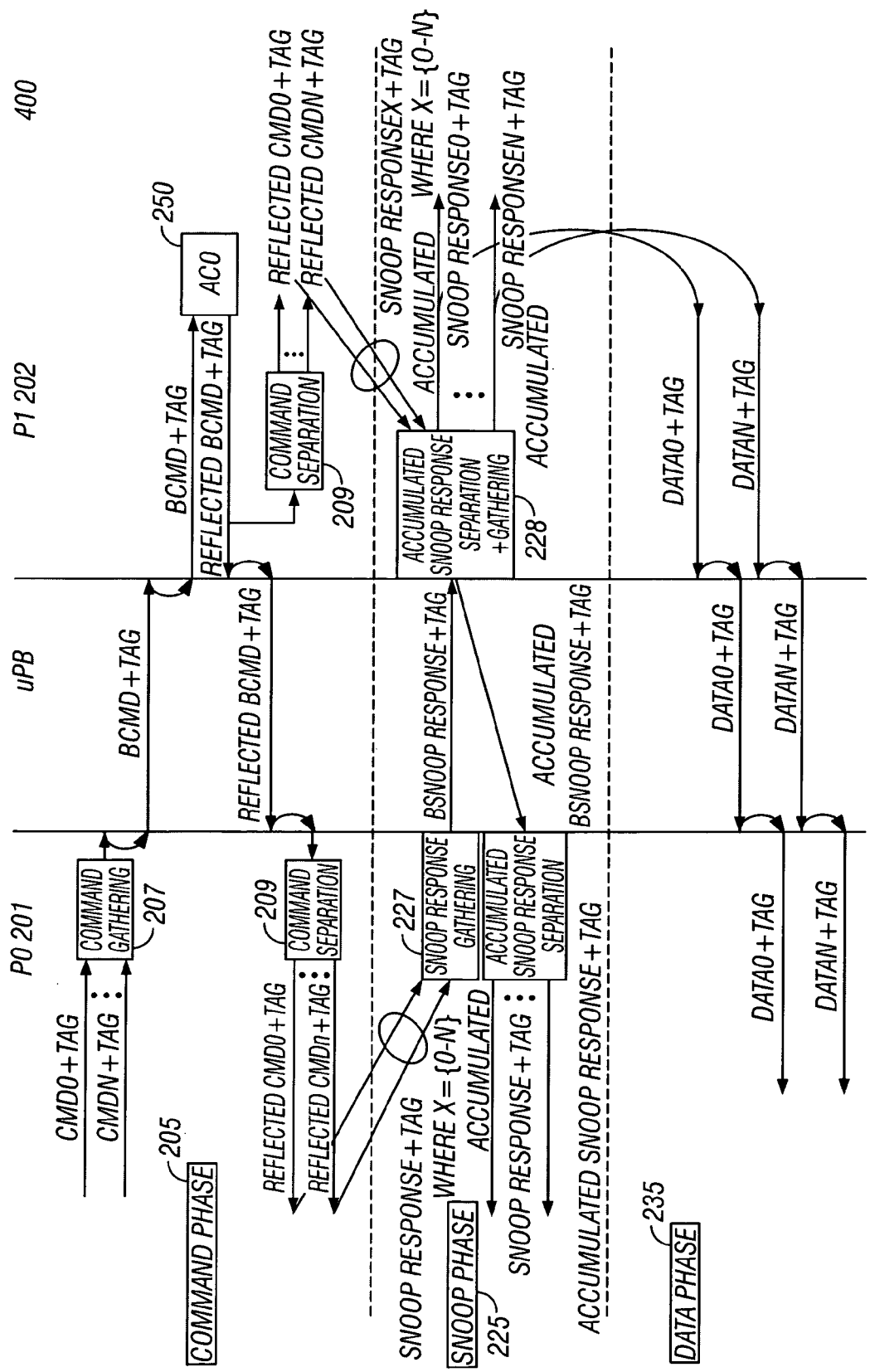
FIG. 4 illustrates a modified exemplary burst load coherency protocol.
Figure 5:
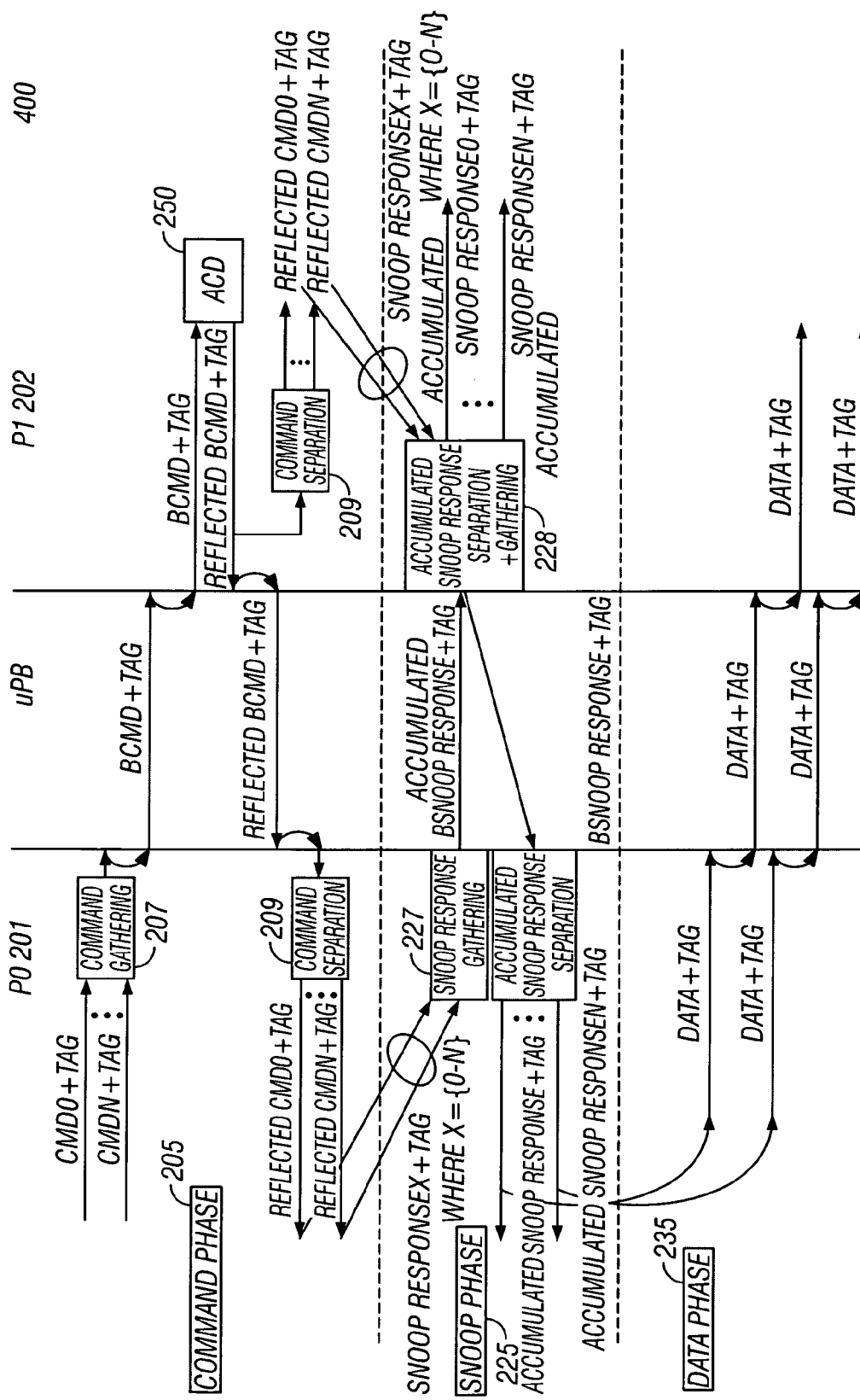
FIG. 5 illustrates a modified exemplary burst store coherency protocol.

An individual skilled in the art can observe from FIG. 2 and FIG. 3 that each request from processor P0 201 requires four packets (Command, Reflective Command, Snoop Response, and Accumulated Snoop Response) for transference on the MP bus for each cache-line of data requested in order to maintain coherency. Since the MP bus is typically a performance bottleneck in a multiprocessor system, the added coherency actions only exasperate the bottleneck. FIG. 4 and FIG. 5 disclose an improved exemplary implementation of a MP bus protocol for minimizing the overhead associated with coherency. The MP bus protocol differs from the prior art by defining additional commands for requesting the transfer of multiple cache-lines and extending the 'Snoop Response' and 'Combined Snoop Response' packets to include the responses for all cache-lines requested by a command (CMD).

Turning to FIG. 4, disclosed is an exemplary implementation of a modified load transaction for requesting multiple cache-lines with a single command. The name of this transaction is 'MP bus burst load' transaction. In FIG. 4, a function 207 exists for detecting which cache-lines are available for gathering into a burst type command. A simple gathering function would be to detect commands requesting sequential cache-lines. The new burst command is forwarded to AC0 250 using a MP bus command transfer. As in the prior art, the command is serialized by AC0 250 and broadcast to a new command separation function 209 as a burst form of a reflected command. The command separation function splits the burst form of the reflected command into single cache-line request, and those requests forward to all entities in the processor. As in the prior art, each entity performs a snoop of the address requested by the command and returns a response to the Snoop Response Gathering function 227. Each entity's snoop response in P0 201 for a given cache-line is accumulated by the Snoop Response gathering function 227. The accumulation is the same as the accumulation performed by the prior art Accumulated Snoop Response 240 in FIG. 2, however, performed only on the responses from entity's within P0 201. Next, the Snoop Response Gather function 227 gathers the responses for all cache-lines requested by the burst command into a new burst snoop response. The new response is then sent to "Accumulated Snoop Response Separation" function 228. The burst accumulated snoop response is then accumulated with the responses from the entities in P1 202 into a new burst accumulated snoop response. Next, the new response is sent to the "Accumulated Snoop Response Separation" function 229. The accumulated snoop responses from both P0 201 and P1 202 are then separated into the individual accumulated snoop responses by functions 228 and 229. The individual accumulated snoop responses are then forwarded to all entities with in the associated processor. From this point, the data transfer is the same as in FIG. 2.

Turning to FIG. 5, disclosed is an exemplary implementation of a modified store transaction for requesting multiple cache-lines with a single command. This transaction is referred to as a 'MP bus burst store' transaction. The basic sequence of a MP bus burst store transaction is the same as the MP bus burst load transaction. For a store operation, the data is transferred to the slave, P1 202 in this case, instead of the requestor, as in FIG. 2, during the Data Phase 235.

The Command Gathering 207, Command Separation 209, Snoop Response Gathering 227 and Accumulated Snoop Response Separation 229 functions disclosed in FIGS. 4 and 5 reduce the number of transfers required on the μPB to maintain coherency. For example, when aggregated over a burst of two cache-lines, the overhead is reduced from the four transactions in the prior art to an effective two transactions per cache-line. These gathering and separation functions can be implemented independent of the system caches or may be integrated. In addition, the command gathering function can be implemented as part of a processor's prefetch mechanism (prefetch is not shown for purposes of clarity) and the separations function as part of a cache's snooping mechanism (snooping mechanisms are not shown for purposes of clarity.)

It is understood that the present invention can take many forms and implementations. Accordingly, several variations may be made in the foregoing without departing from the spirit or the scope of the invention. The capabilities outlined herein allow for the possibility of a variety of design and programming models. This disclosure should not be read as preferring any particular design or programming model, but is instead directed to the underlying mechanisms on which these design and programming models can be built.

Having thus described the present invention by reference to certain of its salient characteristics, it is noted that the features disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description. Accordingly, it is appropriate that the appended claims be construed broadly and in a manner consistent with the scope of the invention.

The invention claimed is:

1. A method in a multiprocessor system, including at least two processors and a cache coherency controller, coupled to address concentration devices, the method operable in said cache coherency controller for improving coherent data transfers, the method comprising the steps of:
   initiating a first memory transaction request command to a first processor of said multiple processors;
   determining priority receipt status of a next memory transaction request;
   expanding snoop responses and accumulated snoop responses to provide a coherency action for all cacheline requests utilizing a burst command;
   forwarding said transaction requests from said master or said controller to a solitary global serialization device, said serialization device further comprising a multiple cacheline request indicator;
   grouping multiple and sequential coherent transfers into a burst operation on said processor bus;
   determining occurrence of the burst operation;
   timing said burst operation;
   snooping said burst operation to form a plurality of snoop replies;
   concentrating all addresses of said plurality of snoop replies to form a combined snoop response; and
   broadcasting the combined snoop response to a plurality of device entities.

2. The method of claim 1 wherein said determining said occurrence of said burst operation comprises detecting an indication that a plurality of cachelines is requested.

3. The method of claim 2 wherein each processor of said at least two processors supports snooping a plurality of cachelines for the burst operation.

4. The method of claim 1 wherein said snooping said burst operation comprises separating said burst operation into multiple cacheline requests on a bus.

5. The method of claim 1 wherein said snooping said burst operation comprises at least a bus and at least a cache directly supporting a burst operation.

6. The method of claim 1 wherein broadcast of said combined snoop response is between pluralities of processors.

7. The method of claim 1 wherein said determining said occurrence of said burst operation includes the step of:
   determining whether a previous cacheline request corresponding to said processor is already present in a first-in first-out queue; and
   queuing said cacheline request in response to a determination that said cacheline request is not already present in said first-in first-out queue.

8. The method of claim 1 wherein accumulated snoop responses agglomerate as a combined response only on notification of individual responses of said entities within said processors.

9. A method of performing a burst transfer on a bus with cache coherency, the method comprising:
   initiating a burst transfer command on a bus connecting a plurality of processors, wherein the burst transfer command is a request to access a block of data that comprises two or more cachelines;
   performing, by each given processor within the plurality of processors, a cache snoop of the burst transfer command to form a burst snoop response;
   accumulating burst snoop responses for the two or more cachelines from the plurality of processors to form a combined snoop response; and
   broadcasting the combined snoop response to the plurality of processors, wherein performing a cache snoop of the burst transfer command comprises:
- splitting, by a snooping processor within the plurality of processors, the burst transfer command into a plurality of single cacheline requests;
- forwarding the plurality of single cacheline requests to a plurality of entities within the snooping processor; and
- performing, by each entity within the snooping processor, a cache snoop of each of the plurality of single cacheline requests to form a plurality of single cacheline snoop responses.

10. The method of claim 9, wherein initiating a burst transfer command comprises:
responsive to a plurality of transfer commands requesting to access a plurality of sequential cachelines from a plurality of entities within an initiating processor, accumulating the plurality of transfer commands to form the burst transfer command.

11. The method of claim 10, further comprising:
responsive to receipt of the combined snoop response at the initiating processor, separating the combined snoop response into a plurality of individual snoop responses; and
forwarding the plurality of individual snoop responses to the pluralities of entities within the initiating processor.

12. The method of claim 9, wherein performing a cache snoop of the burst transfer command further comprises:
returning the plurality of single cacheline snoop responses from each entity within the snooping processor to a gathering function within the snooping processor, wherein the gathering function accumulates the plurality of single cacheline snoop responses to form a burst snoop response for the snooping processor.

13. A data processing system comprising:
a plurality of processors; and
a bus connecting the plurality of processors,
wherein an initiating processor from the plurality of processors initiates a burst transfer command on the bus and wherein the burst transfer command is a request to access a block of data that comprises two or more cachelines;

wherein each given processor within the plurality of processors performs a cache snoop of the burst transfer command to form a burst snoop response;

wherein a snoop response gathering function accumulates burst snoop responses for the two or more cachelines from the plurality of processors to form a combined snoop response and broadcasts the combined snoop response to the plurality of processors, wherein a separation function within a snooping processor within the plurality of processors splits the burst transfer command into a plurality of single cacheline requests and forwards the plurality of single cacheline requests to a plurality of entities within the snooping processor; and wherein each entity within the snooping processor performs a cache snoop of each of the plurality of single cacheline requests to form a plurality of single cacheline snoop responses.

14. The data processing system of claim 13, wherein, responsive to a plurality of transfer commands requesting to access a plurality of sequential cachelines from a plurality of entities within the initiating processor, a gathering function within the initiating processor accumulates the plurality of transfer commands to form the burst transfer command.

15. The data processing system of claim 14, wherein, responsive to receipt of the combined snoop response at the initiating processor, a separation function within the initiating processor separates the combined snoop response into a plurality of individual snoop responses and forwards the plurality of individual snoop responses to the pluralities of entities within the initiating processor.

16. The data processing system of claim 13, wherein a gathering function within the snooping processor accumulates the plurality of single cacheline snoop responses to form a burst snoop response for the snooping processor.

* * * * *